(12) United States Patent
Miller

(10) Patent No.: US 6,248,953 B1
(45) Date of Patent: Jun. 19, 2001

(54) SEGMENTED END SEAL FOR A CLOSURE SUCH AS A SPLICE CASE

(75) Inventor: James R. Miller, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/422,551

(22) Filed: Oct. 21, 1999

Related U.S. Application Data

(60) Provisional application No. 60/119,037, filed on Feb. 5, 1999.

(51) Int. Cl.[7] .............................. H02G 15/02; H01R 4/00
(52) U.S. Cl. .................. 174/74 R; 174/77 R; 174/84 R; 174/92; 174/93
(58) Field of Search .............................. 174/92, 93, 88 R, 174/84 R, 82, 77 R

(56) References Cited

U.S. PATENT DOCUMENTS

| | | | |
|---|---|---|---|
| 4,692,565 | 9/1987 | Koht et al. | 174/77 |
| 4,857,672 | * 8/1989 | Rebers et al. | 174/93 |
| 5,006,669 | * 4/1991 | Bachel et al. | 174/93 |
| 5,059,728 | 10/1991 | Allen et al. | 174/87 |
| 5,258,578 | 11/1993 | Smith et al. | 174/77 |
| 5,313,019 | * 5/1994 | Brusselmans et al. | 174/93 |
| 5,561,268 | * 10/1996 | Dagan et al. | 174/92 |
| 5,675,124 | * 10/1997 | Stough et al. | 174/65 G |
| 5,789,707 | * 8/1998 | Damm et al. | 174/655 SS |
| 5,792,991 | * 8/1998 | Nolf | 174/92 |
| 5,825,961 | 10/1998 | Wilkins et al. | 385/135 |
| 6,046,406 | * 4/2000 | Milanowski et al. | 174/77 R |
| 6,051,792 | * 4/2000 | Damm et al. | 174/93 |

FOREIGN PATENT DOCUMENTS

| | | |
|---|---|---|
| 818334 | 9/1937 | (FR). |
| WO 98/21799 | * 3/1997 | (WO). |
| WO 98/21799 | 5/1998 | (WO). |

OTHER PUBLICATIONS

International Search Report for PCT/US00/01872.
PSI Catalog—"2–Type Closure System," (Jan. 1990).

* cited by examiner

Primary Examiner—Anthony Dinkins
Assistant Examiner—William H. Mayo, III
(74) Attorney, Agent, or Firm—Darla P. Fonseca

(57) ABSTRACT

An end seal is provided for sealing the space between at least one cable and a closure such as a splice case. The end seal includes a centrally located support structure having a plurality of radially extending members each defined by spaced, opposing end faces and an outer peripheral surface. Each of the radially extending members has first and second mating surfaces and a notch located in the first and second mating surfaces. The first and second mating surfaces are connected to, and extend between, the end faces of their respective radially extending members. The end seal also includes a plurality of segments having spaced, opposing end faces. The plurality of segments each interlock with the support structure so that each of the end faces of the segments extend in a common plane with one of the end faces of the support structure. Each segment includes an outer peripheral surface and first and second end surfaces connected to and extending between the end faces of the segment. The first and second end surfaces have first and second tabs extending respectively therefrom. The first and second tabs are insertable in first and second ones of the notches respectively located in adjacent ones of the radially extending members of the support structure. The first and second tabs of at least one segment are arranged so that they must be inserted in the first and second notches, respectively, in a prescribed sequence so that the segment interlocks with the support structure. At least one aperture extends between the opposing end faces for receiving a cable. The aperture is formed, at least in part, from a semicylindrical surface located in one of the segments.

37 Claims, 5 Drawing Sheets

SEGMENTED END SEAL FOR A CLOSURE SUCH AS A SPLICE CASE

This application is a regular application claiming priority from U.S. provisional application No. 60/119,037, filed Feb. 5, 1999.

FIELD OF THE INVENTION

The present invention relates generally to a segmented end seal for cables entering a splice case, and in particular to a segmented end seal in which the cable-receiving segments readily interlock with a central support body with a minimum of additional hardware.

BACKGROUND OF THE INVENTION

Two or more cables, such as telecommunications cables, must often be spliced together to extend or tap into a cable. The formation of a splice involves removal of the outer jacket and other layers of the cable to expose the individual conductors or optical fibers which are then individually connected to the conductors or fibers of another cable or cables. After the splice is formed, it must be protected from water and other vapors to prevent corrosion or a short circuit. For this purpose, the splice area is often enclosed in a splice case that is formed from two trough-like half shells with separate end plates or seals. Different end seals are used to accommodate different diameter cables and splice cases of different dimensions.

While end seals have been proposed which have many different designs and configurations, one disadvantage they have in common is that it is cumbersome and time-consuming to add or remove a cable. For example, U.S. Pat. No. 5,258,578 (Smith et al.) discloses an end seal that is adapted to seal the space between the cables and the splice case to restrict fluid transfer through the seal. The seal is formed from a body of an elastic, flexible material such as a gel having self-adhesive properties. The body comprises a core portion and a tail portion. The core portion has a shape corresponding to the ends of the splice case and includes cylindrical openings through which the cables extend. The openings are exposed at the outer peripheral surface of the core. The body of the seal also includes a tail portion that is integral with, and extends from, the surface of the core portion. The tail portion has a length sufficient to wrap about the outer peripheral surface of the core to cover all the cylindrical openings. The openings are generally smaller than the diameter of the cables to be placed therein so that the elastic core must expand for the openings to accommodate the cables. When wrapped around the core, the tail seals the portion of the cable between the core and the inside surface of the ends of the splice case. One limitation of this end seal is that, whenever it is removed from a splice case, the seals formed between the core and the cables extending through the openings in the core are disturbed, and therefore the cables must be repositioned upon re-installation of the end seal.

Another proposed type of end seal is formed from two or more segments that mate with a centrally located support structure. End seals of this type are shown, for example, in U.S. Pat. No. 4,692,565 (Koht et al.). The segments contain one or more apertures for receiving a cable. When a cable must be added, removed or changed, it is thus only necessary to remove the segment containing the given cable without disturbing the remaining segments. However, the segments, which surround and abut the support structure, are not fastened to the support structure. Rather, the segments and the support structure are held together by the forces exerted upon them by the splice case itself. Accordingly, when one segment is removed from the splice case, the remaining segments and the support structure will not necessarily remain in place.

Another segmented end seal is disclosed in U.S. Pat. No. 5,825,961 (Wilkins et al.). A similar type of end seal is disclosed in a PSI Telecommunications Inc. catalog entitled "2-Type Closure System" (1990). In this type of end seal, the segments are secured to the support structure by a pair of bolts. While this arrangement prevents the individual components of the end seal from easily separating from one another, it makes it difficult to remove a single segment, since two bolts must be removed.

Another problem with many existing end seals is that they do not have a plane of symmetry, and are therefore not reversible. As a result, two different end seals must be made for use in a conventional splice tray, and these end seals cannot be used interchangeably. This adds to the manufacturing costs, and also complicates the use of these end seals in the field.

There is thus a need in the art for a segmented end seal in which the segments can be easily attached to, and removed from, the support body with a minimum of additional hardware, yet which can be adapted to provide a desired pressure distribution (e.g., an even pressure distribution) across a particular segment. There is also a need in the art for a segmented end seal in which the segments can be independently removed without disrupting the remaining segments or existing seals between the end seal and any cables inserted therein. There is further a need in the art for an end seal which has a plane of symmetry such that the end seal is reversible, and can be used for either side of a splice case.

These and other needs are met by the present invention, as hereinafter described.

SUMMARY OF THE INVENTION

The present invention provides a segmented end seal in which the segments interlock with the support structure so that only a single fastener is needed to fix a given segment to the support structure. This result is achieved by providing the segments with tabs that are inserted into notches located in the support structure. The tabs are oriented with respect to one another such that they must be inserted and removed from the notches in a particular sequence. Typically, the tabs are oriented so as to provide an even distribution of pressure across the segment, but they can also be oriented so as to provide an unequal distribution of pressure across the segment if such is desired. The end seal is preferably constructed with a plane of symmetry such that the end seal is reversible and can be used in either side of a conventional splice case.

In accordance with one aspect of the invention, an end seal is provided for sealing the space between at least one cable and a closure. The end seal includes a centrally located support structure having a plurality of radially extending members, each member being defined by spaced, opposing end faces and an outer peripheral surface. Each of the radially extending members has first and second mating surfaces and a notch located in the first and second mating surfaces. The first and second mating surfaces are connected to, and extend between, the end faces of their respective radially extending members. The end seal also includes a plurality of segments having spaced, opposing end faces. The plurality of segments each interlock with the support structure so that each of the end faces of the segments extend in a common plane with one of the end faces of the support structure. Each segment includes an outer peripheral surface and first and second end surfaces connected to, and extending between, the end faces of the segment. The first and second end surfaces have first and second tabs, respectively, which extend therefrom. The first and second tabs are insertable in first and second notches, respectively, which notches are located in adjacent, radially extending members of the support structure. The first and second tabs of at least one segment are arranged so that they must be inserted in the first and second notches, respectively, in a prescribed sequence so that the segment interlocks with the support structure. At least one aperture extends between the opposing end faces for receiving a cable. The aperture is formed, at least in part, from a semicylindrical surface located in one of the segments.

In some embodiments of the present invention, the apertures in the end seal are provided with a plurality of fingers which extend from the inner surface of the aperture to the interior thereof. The fingers are constructed (e.g., out of a semi-rigid plastic such as polyethylene) so that they are deformed when a cable is inserted into the aperture, thereby providing an initial seal between the cable and the end seal. This feature is especially useful in conjunction with expandable foams or gels which exhibit some tendency to flow, since the initial seal provided by the fingers helps to reduce such flow. In one particular embodiment, the fingers, when disposed in the aperture, have the appearance of a circle which is cut into a plurality of triangular sections, the tips of which sections meet at an interior point (e.g., the center) of the circle.

DETAILED DESCRIPTION OF THE DRAWINGS

Figure 1:
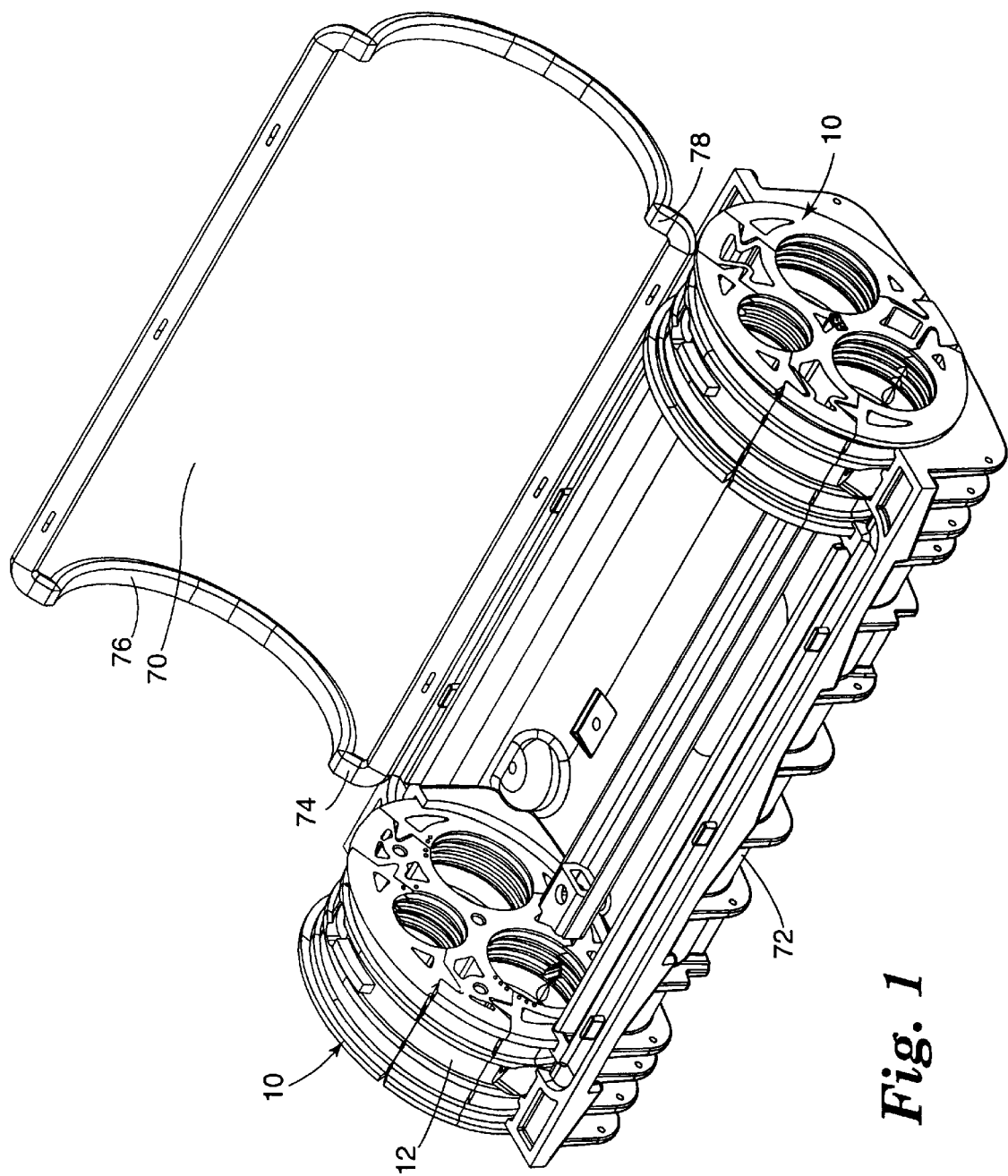
FIG. 1 shows an exemplary cable splice enclosure in which the inventive end seal may employed.

As shown in FIG. 1, an exemplary cable splice enclosure in which the inventive end seal may be employed comprises two semicylindrical half shells 70 and 72 that are joined together at flanges 74 by a suitable fastener. When the shells are joined together, they define opposing circular openings, each of which receive an end seal 10. The circular openings each have a circumferential surface 76 that are extensions of the flanges. The circumferential surfaces contact the sealing surface 12 of the end seals. The flanges, including the peripheral surfaces, support an elastomeric gasket 78 to form a seal between the flanges of the two half shells themselves and between the half shells and the respective sealing surfaces of the end seals. Of course, the end seal of the present invention may be used in many different types of splice cases and other closures and is not limited in applicability to the splice case depicted in FIG. 1. Moreover, the closure may employ only one end seal (such as in a closure for a butt-splice in which the cable only penetrates one end of the closure) or the closure may employ two end seals (such as in a closure for an in-line splice in which the cable penetrates both ends of the closure).

Figure 2:
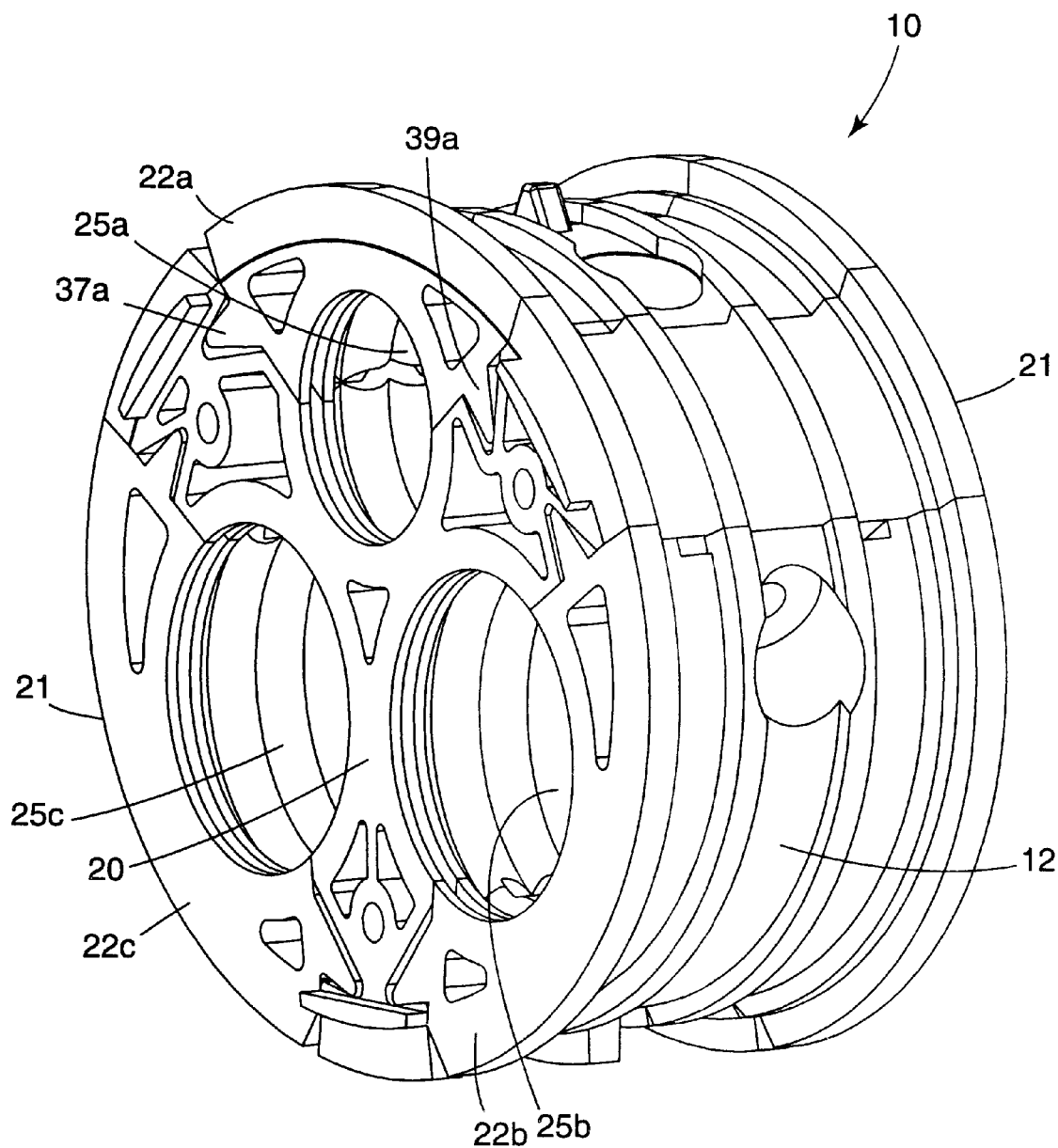
FIG. 2 shows a perspective view of the segmented end seal in accordance with the principles of the present invention.
Figure 3:
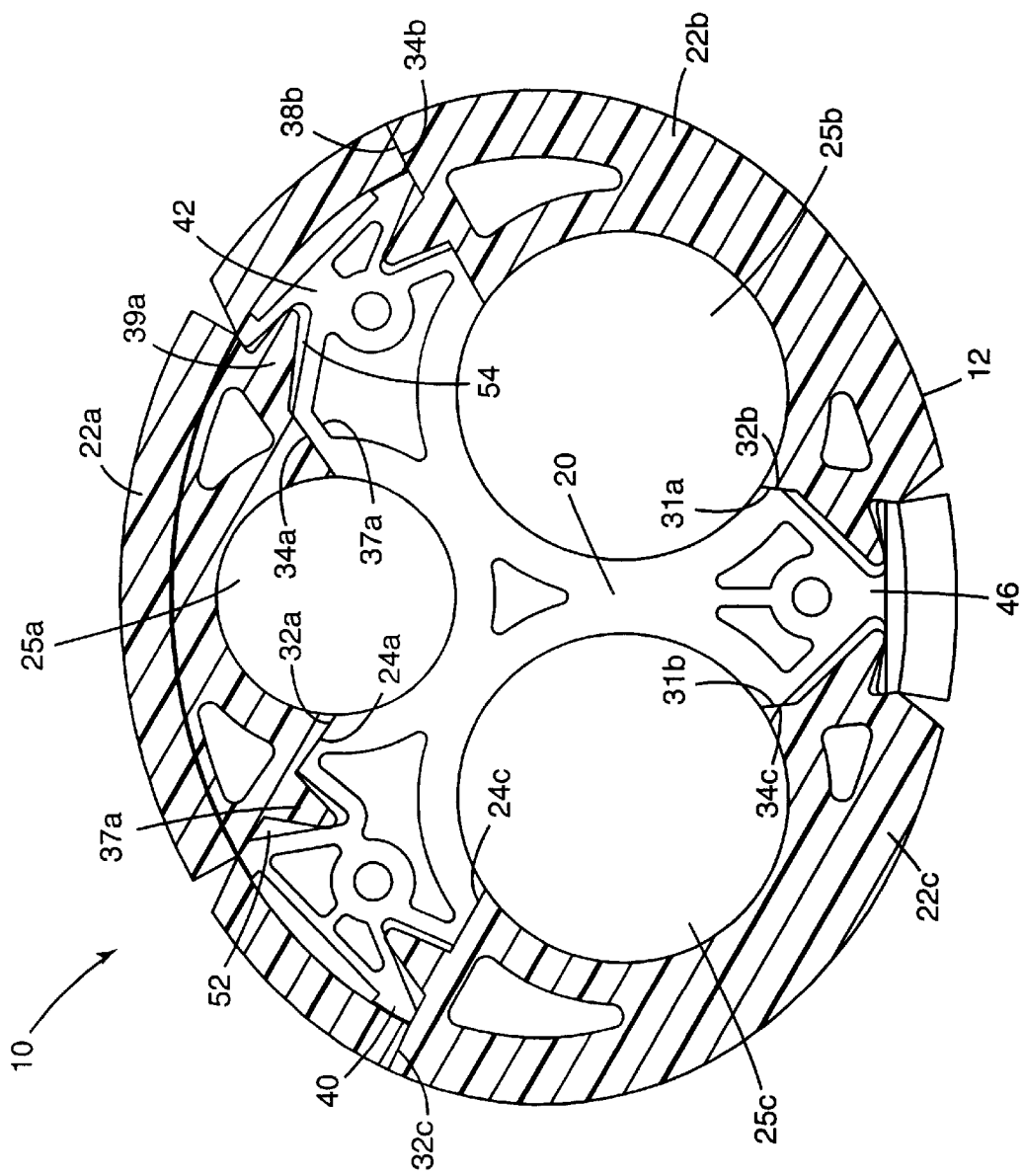
FIG. 3 shows a plan view of an end face of the end seal depicted in FIG. 2.

FIG. 2 shows a perspective view of the segmented end seal in its assembled state. The end seal includes a body defined by opposing end faces 21 (only one of which is visible in FIG. 2) and an outer sealing surface extending between the end faces. As indicated in FIG. 1, outer sealing surface contacts the outer circumferential surface of an end of the splice case to form a seal therebetween. Three apertures 25a, 25b, and 25c extend through the body and between the end faces. Each aperture is configured to receive a cable that is to enter the splice case through the end seal. The components of the end seal shown in FIG. 2 are also shown in FIG. 3, which depicts a plan view of an end face of the end seal in its assembled state. The various components of the end seal will be further described below with reference to FIGS. 4 and 5.

Figure 4:
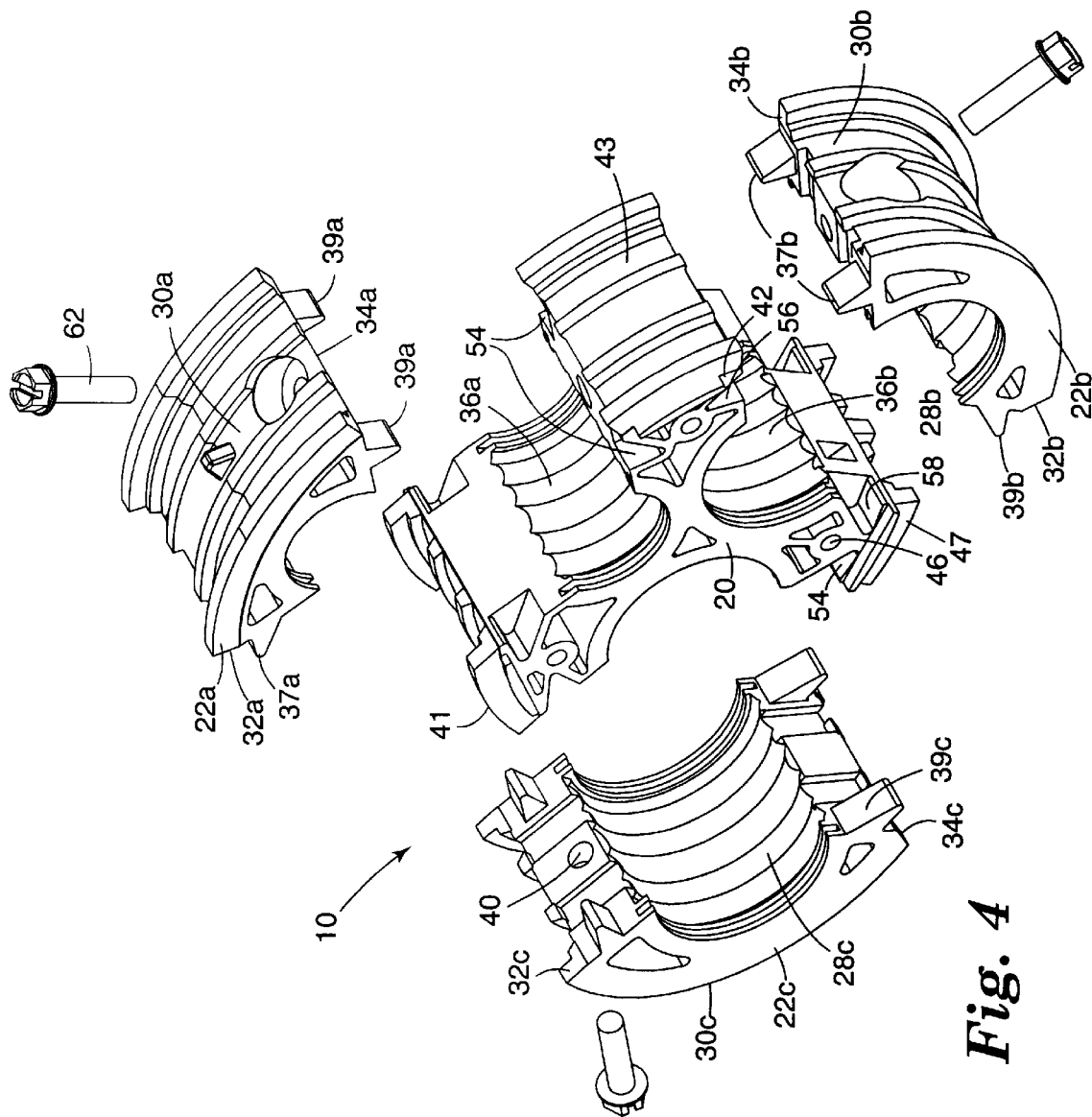
FIGS. 4 and 5 show, respectively, an exploded perspective view and an exploded plan view of the segmented end seal shown in FIGS. 2 and 3.
Figure 5:
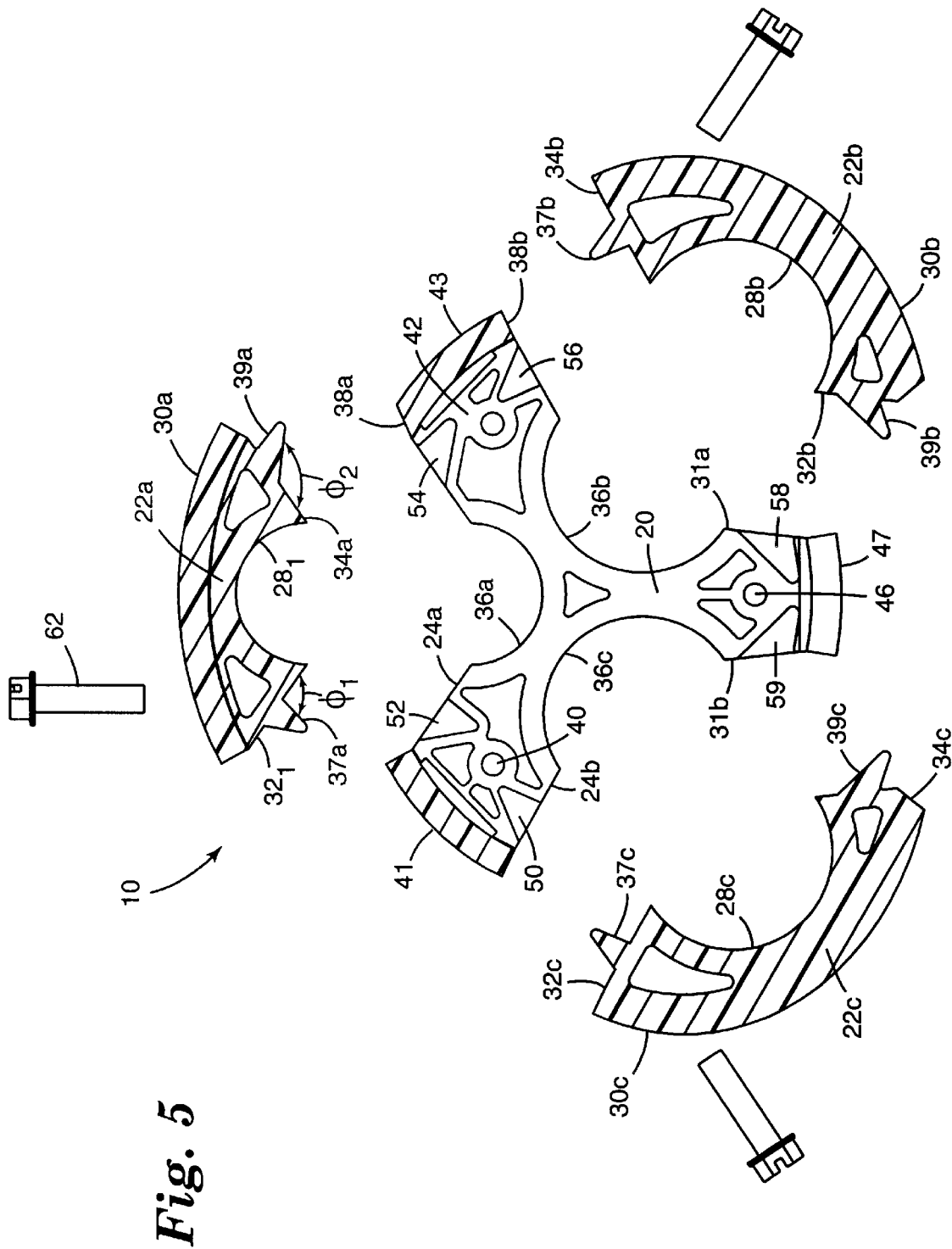

FIGS. 4 and 5 show, respectively, an exploded perspective view and an exploded plan view of the segmented end seal shown in FIGS. 2 and 3. The end seal includes a support structure 20 and segments 22a, 22b, and 22c that interlock with the support structure in the manner shown in FIGS. 2 and 3 and described below. Segment 22a has an outer surface portion 30a that makes up a portion of the outer sealing surface shown in FIG. 2. Segment 22a also has an inner semicylindrical surface 28a and first and second mating surfaces 32a and 34a, which connect outer surface portion 30a to inner semicylindrical surface 28a. As shown, segments 22b and 22c are configured similar to segment 22a. That is, segment 22b includes an outer surface portion 30b which forms a portion of the outer sealing surface, inner semi-cylindrical surface 28b, and first and second mating surfaces 32b and 34b. Likewise, segment 22c includes an outer surface portion 30c which also forms a portion of the outer sealing surface, inner semi-cylindrical surface 28c, and first and second mating surfaces 32c and 34c.

The support structure includes three members 40, 42, and 46 that extend radially outward from the center of the support structure. The support structure also includes outer semicylindrical surfaces 36a, 36b, and 36c. The ends of semi-cylindrical surface 36a join with mating surfaces 24a and 38a of radially extending members 40 and 42, respectively. Likewise, the ends of semicylindrical surface 36b join with mating surfaces 38b and 31a of radially extending members 42 and 46, respectively, while the ends of semi-cylindrical surface 36c join with mating surfaces 31b and 24b of radially extending members 46 and 40, respectively. The apertures 25 are defined by respective pairs of the inner semicylindrical surfaces 28 of segments 22 and outer semi-cylindrical surfaces 36 of the support structure. For example, aperture 25a is defined by inner semicylindrical surface 28a and outer semi-cylindrical surface 36a.

As further shown in FIGS. 4 and 5, radially extending members 40, 42 and 46 also respectively include outer surface portions 41, 43, and 47, respectively, which, together with the outer surface portions of segments 22a, 22b, and 22c, form the outer sealing surface of the end seal.

In its assembled state, segments 22a, 22b, and 22c are joined to the support structure in the manner indicated in FIGS. 2 and 3. More specifically, with respect to segment 22a, mating surface 32a abuts mating surface 24a of radially extending member 40 and mating surface 34a abuts mating surface 38a of radially extending member 42. Similarly, with respect to segment 22b, mating surface 34d abuts mating surface 38b of radially extending member 42 and mating surface 32b abuts mating surface 31a of radially extending member 46. Finally, with respect to segment 22c, mating surface 32c abuts mating surface 24b of radially extending member 40 and mating surface 34c abuts mating surface 31b of radially extending member 46.

In accordance with the present invention, the mating surfaces of segments 22a, 22b and 22c are each provided with pairs of tabs that are insertable in slots located in their corresponding mating surfaces of radially extending members 40, 42, and 46. The tabs are arranged so that the segments interlock with the support structure only when the tabs are inserted into the slots in a particular sequence. For example, with respect to segment 22a shown in FIG. 3, retaining tabs 39a must be inserted into slots 54 prior to inserting locking tabs 37a into slots 52. The specific procedure that is employed so that segment 22a properly interlocks with the support structure 20 is as follows. First, segment 22a is oriented so that retaining tabs 39a slide into slots 54. Next, segment 22a is pivoted about retaining tabs 39a until locking tabs 37a slide into slots 52 so that segment 22a interlocks with the support structure. In other words, tabs 37a and 39a are oriented with respect to one another in such a way that the segments cannot be installed in, or removed from, the support structure simply by radially displacing segment 22a inward (when installing the segments) or outward (when removing the segments). Rather, segments 22a must be pivoted into position in the previously described manner. This procedure is required because, as indicated in FIG. 5, retaining tabs 39a are oriented so that the angle $\phi_1$ formed between retaining tabs 39a and the radially inward portion of mating surface 34a is greater than the angle $\phi_2$ formed between locking tabs 37a and the radially inward portion of mating surface 32a. As depicted in the figures, the angle $\phi_1$ will generally be an obtuse angle.

The specific values for the angles $\phi_1$ and $\phi_2$ can vary somewhat, and can be manipulated to produce a desired pressure distribution across segment 22a. In particular, these angles can be manipulated to produce a greater pressure on one end of the segment or the other, or to produce an essentially equal pressure distribution across the segment. However, $\phi_2$ is preferably within the range ±20° from normality, more preferably within the range ±6° to ±18° from normality, and most preferably is about ±12° from normality. The optimum value for $\phi_1$, when $\phi_2$ is about 112°, is about 221°. When $\phi_1$ has this value, tab 39a slides smoothly in a sideward motion (from tab 39a to tab 37a) into its locking position as force is applied (e.g., via bolt 62) to drive tab 37a into slot 52. When $\phi_1$ deviates too far from these values, tab 39a may not engage slot 52 as smoothly, and/or may exhibit an increased tendency to pop out of slot 52. Of course, one skilled in the art will appreciate that the optimum values for these angles may be affected by the particular application to which the device is directed, the desired pressure distribution across the segment, the materials out of which the segment is made, the dimensions of tab, and other such factors.

While not described in detail, segments 22b and 22c have locking and retaining tabs that function in the same manner as described with respect to segment 22a.

As previously mentioned, the procedure used for interlocking segments 22a, 22b, and 22c with the support structure can only be accomplished by inserting their respective tabs into their corresponding slots in the correct sequence. If the sequence is reversed so that, for example, locking tabs 37a of segment 22a are inserted prior to retaining tabs 39a, then when segment 22a is pivoted about tabs 37a, tabs 39a will not be accepted by slots 52. Moreover, the segments 22a, 22b, and 22c can only be removed from the support structure by reversing the installation procedure so that the tabs are removed from the slots in the reverse sequence (i.e., the second pair of tabs inserted in their corresponding slots is the first pair removed). That is, segment 22a is removed by first pivoting it outward so that locking tabs 37a are removed from slots 52. Once tabs 37a are removed, retaining tabs 39a may be slid out of slots 54. However, segment 22a will remain interlocked with support structure if an attempt is made to remove retaining tabs 39a prior to locking tabs 37a.

Because of the particular arrangement of the tabs, segments 22a, 22b, and 22c each may be fastened to the support structure with only a single fastener. This may be accomplished with respect to segment 22a, for example, by inserting a bolt 62 or other fastener through mating surfaces 32a and 24a, as indicated in FIGS. 4 and 5. As a result, locking tabs 37a cannot be removed from slots 52 without first removing the fastener. Since tabs 37a cannot be removed, retaining tabs 39a cannot be removed as well. Accordingly, as long as locking tabs 37a are fastened into position, there is no need to additionally fasten tabs 37a into position. In other words, a single fastener is sufficient to lock segment 22a into place so that it cannot be removed.

Although various embodiments are specifically illustrated and described herein, it will be appreciated that modifications and variations of the present invention are covered by the above teachings and are within the purview of the appended claims without departing from the spirit and intended scope of the invention. For example, the shape of the end seal need not be round, but may have any shape (e.g., oval) which is necessary to conform to the end of the splice case or other closure in which it is to be located. Additionally, the end seal may include any number of segments (but at least two) and is thus not limited to the three segments shown in the embodiment depicted in the figures. Likewise, the number of cable-receiving apertures may vary from end seal to end seal and even from segment to segment. In this regard, one of ordinary skill in the art will recognize that the apertures need not be formed in both the segments and the support structure. Rather, one or more of the apertures may be located entirely within a single segment. In fact, in some embodiments of the invention, all of the apertures may be entirely formed in the various segments so that the support structure is free of any surfaces that directly mate with a cable. The end seals of the present invention may also be provided with ribs where appropriate to increase the strength of the end seal, and holes or indentations to conserve materials and reduce weight.

What is claimed is:

1. An end seal for sealing a space between at least one cable and a closure, comprising:

a centrally located support structure having a plurality of radially extending members, each of said members defined by spaced, opposing end faces and an outer peripheral surface and having first and second mating surfaces, each of said first and second mating surfaces having a notch therein, each of said members having said first and second mating surfaces connected to and extending between the end faces of the member;

a plurality of segments having spaced, opposing end faces, the plurality of segments each interlocking with the support structure so that each of the end faces of the segments extend in a common plane with one of the end faces of the support structure, each of the segments including an outer peripheral surface and first and second end surfaces connected to and extending between the end faces of the segment, said first and second end surfaces having first and second tabs extending therefrom, respectively, each of said first and second tabs being insertable in a notch respectively located in adjacent ones of the radially extending members of the support structure, wherein the first and second tabs of at least one of said plurality of segments are arranged so that they must be inserted in the notches in the members of the support structure in a prescribed sequence so that the segment interlocks with the support structure; and at least one aperture extending between the opposing end faces for receiving a cable, said at least one aperture being formed, at least in part, from a semicylindrical surface located in one of the plurality of segments.

2. The end seal of claim 1, wherein each of the opposing end faces of each of the radially extending members includes a pair of notches, and wherein the first and second end surfaces of the segments each include a pair of first and second tabs, respectively.

3. The end seal of claim 1, wherein the at least one aperture is formed from a semicylindrical surface located entirely in one of the segments.

4. The end seal of claim 1, wherein the at least one aperture is formed from first and second semicylindrical surfaces respectively located in one of the segments and the support structure.

5. The end seal of claim 1, wherein the segments and the support structure are shaped so that in an assembled state the end seal has a circular cross-sectional shape.

6. The end seal of claim 1, wherein the plurality of segments comprise three segments and the at least one aperture includes three apertures, wherein each of the apertures is formed from first and second semicylindrical surfaces respectively located in the support structure and a different one of the segments.

7. The end seal of claim 1, wherein the first and second tabs of a given segment form first and second angles, respectively, with the end surfaces of the given segment, said first angle being greater than the second angle.

8. The end seal of claim 7, wherein the first angle is an obtuse angle.

9. The end seal of claim 8, wherein the given segment interlocks with the support structure by inserting the first tab into the first notch before the second tab is inserted into the second notch.

10. An end seal assembly, comprising:

first and second end seal sections, said first and second sections being matable across a first plane by means of a first tab and a first receptacle adapted to receive said first tab, said first and second sections being further matable across a second plane by means of a second tab and a second receptacle adapted to receive said second tab; wherein said first and second sections form at least one aperture when said sections are mated across said first and second planes, wherein the smallest angle between said first tab and said first plane is $\phi_1$, wherein the smallest angle between said second tab and said second plane is $\phi_2$, and wherein $\phi_1 > \phi_2$.

11. The end seal assembly of claim 10, wherein said at least one aperture is essentially circular.

12. The end seal assembly of claim 10, wherein said first section has at least one arcuate surface.

13. The end seal assembly of claim 10, wherein $\phi_2$ is within the range of about 70° to about 110°.

14. The end seal assembly of claim 10, wherein $\phi_2$ is within the range of about 70° to about 108°.

15. The end seal assembly of claim 10, wherein $\phi_2$ is within the range of about 78° to about 102°.

16. The end seal assembly of claim 10, wherein $\phi_2$ is within the range of about 82° to about 98°.

17. The end seal assembly of claim 10, wherein $\phi_2$ is about 112° and $\phi_1$ is about 139°.

18. The end seal assembly of claim 10, wherein said first tab and said first receptacle are complimentary in shape.

19. The end seal assembly of claim 18, wherein said second tab and said second receptacle are complimentary in shape.

20. The end seal assembly of claim 10, wherein said first tab has a cross-sectional shape in at least one plane that is essentially triangular.

21. The end seal assembly of claim 10, wherein said first and second segments are secured together by means of a fastener.

22. The end seal assembly of claim 10, further comprising a third section which is matable with said first section across a third plane by means of a third tab and a third receptacle adapted to receive said third tab, said first and third sections being further matable across a fourth plane by means of a fourth tab and a fourth receptacle adapted to receive said fourth tab.

23. The end seal assembly of claim 22, further comprising a fourth section which is matable with said first section across a fifth plane by means of a fifth tab and a fifth receptacle adapted to receive said fifth tab, said first and fourth sections being further matable across a sixth plane by means of a sixth tab and a sixth receptacle adapted to receive said sixth tab.

24. The end seal assembly of claim 23, wherein said first, second, third and fourth sections are interconnectable to form an end seal that is essentially circular in a cross-section taken along at least one plane.

25. The end seal assembly of claim 10, wherein said first section is approximately trilobal in a cross-section taken along at least one plane.

26. An end seal assembly, comprising:

first and second end seal sections, said first and second sections being matable across a first plane by means of a first tab and a first receptacle adapted to receive said first tab, said first and second sections being further matable across a second plane by means of a second tab and a second receptacle adapted to receive said second tab; wherein said first and second sections form at least one aperture when said sections are mated across said first and second planes.

27. The end seal assembly of claim 26, wherein said first and second sections are further matable across said first plane by means of a third tab and a third receptacle adapted to receive said third tab.

28. The end seal assembly of claim 27, wherein said first and second sections are further matable across said second plane by means of a fourth tab and a fourth receptacle adapted to receive said fourth tab.

29. The end seal assembly of claim 28, wherein said first, second, third, and fourth tabs are disposed on said first section.

30. The end seal assembly of claim 26, wherein said fist tab and said first receptacle are complimentary in shape.

31. The end seal assembly of claim 26, wherein said second tab and said second receptacle are complimentary in shape.

32. The end seal assembly of claim 26, wherein said first tab has a cross-sectional shape in at least one plane that is essentially triangular.

33. The end seal assembly of claim 26, wherein said first and second sections are secured together by means of a fastener.

34. The end seal assembly of claim 26, further comprising a third section which is matable with said first section across a third plane by means of a third tab and a third receptacle adapted to receive said third tab, said first and third sections being further matable across a fourth plane by means of a fourth tab and a fourth receptacle adapted to receive said fourth tab.

35. The end seal assembly of claim 34, further comprising a fourth section which is matable with said first section across a fifth plane by means of a fifth tab and a fifth receptacle adapted to receive said fifth tab, said first and fourth sections being further matable across a sixth plane by means of a sixth tab and a sixth receptacle adapted to receive said sixth tab.

36. The end seal assembly of claim 34, wherein said first, second, third and fourth sections are interconnectable to form an end seal that is essentially circular in a cross-section taken along at least one plane.

37. The end seal assembly of claim 26, wherein said first section is approximately trilobal in a cross-section taken along at least one plane.

* * * * *